US011511743B2

(12) United States Patent
Kowalchuk et al.

(10) Patent No.: US 11,511,743 B2
(45) Date of Patent: Nov. 29, 2022

(54) SYSTEM AND METHOD FOR CONTROLLING THE SPEED OF A WORK VEHICLE TOWING AN IMPLEMENT

(71) Applicant: CNH Industrial Canada, Ltd., Saskatoon (CA)

(72) Inventors: Trevor L. Kowalchuk, Saskatoon (CA); Nicholas George Alfred Ryder, Saskatoon (CA)

(73) Assignee: CNH Industrial Canada, Ltd., Saskatoon (CA)

(*) Notice: Subject to any disclaimer, the term of this patent is extended or adjusted under 35 U.S.C. 154(b) by 224 days.

(21) Appl. No.: 16/717,669

(22) Filed: Dec. 17, 2019

(65) Prior Publication Data

US 2021/0179103 A1    Jun. 17, 2021

(51) Int. Cl.
*B60W 30/14* (2006.01)
*B60W 50/14* (2020.01)
*A01B 63/24* (2006.01)

(52) U.S. Cl.
CPC .......... *B60W 30/146* (2013.01); *A01B 63/24* (2013.01); *B60W 50/14* (2013.01); *B60W 2300/15* (2013.01); *B60W 2520/10* (2013.01); *B60W 2530/10* (2013.01); *B60W 2530/207* (2020.02)

(58) Field of Classification Search
CPC combination set(s) only.
See application file for complete search history.

(56) References Cited

U.S. PATENT DOCUMENTS

| 3,236,322 A | 2/1966 | Jonkers et al. |
| 4,454,919 A * | 6/1984 | Arnold ................ A01B 63/1117 172/1 |
| 4,582,141 A | 4/1986 | van der Lely |

(Continued)

FOREIGN PATENT DOCUMENTS

| AU | 2013400807BB | 3/2015 | |
| EP | 2745666 A1 * | 6/2014 | ........... A01B 63/112 |
| WO | WO-2016163874 A1 * | 10/2016 | ............. G01G 19/12 |

OTHER PUBLICATIONS

"Tire code". Wikipedia. Sep. 26, 2019. Provided as "Tire code—Wikipedia". (Year: 2019).*

(Continued)

*Primary Examiner* — Jeff A Burke
*Assistant Examiner* — Madison B Emmett
(74) *Attorney, Agent, or Firm* — Rebecca Henkel; Rebecca DeMille

(57) ABSTRACT

A method for controlling the speed of a work vehicle towing an implement that is movable between a working position, in which ground engaging tools of the implement are configured to perform a field operation, and a transport position, in which the ground engaging tools are raised relative to the ground. The method may include monitoring, with a computing device, an implement weight supported by the implement while the implement is in the transport position. The method may further include comparing, with the computing device, the implement weight to a predetermined threshold weight. Additionally, the method may include, when the implement weight differs from the predetermined threshold weight, adjusting, with the computing device, a maximum speed limit for the work vehicle.

20 Claims, 4 Drawing Sheets

(56) References Cited

U.S. PATENT DOCUMENTS

| | | | |
|---|---|---|---|
| 5,454,432 A * | 10/1995 | Le Clezio | A01B 63/112 172/3 |
| 6,285,938 B1 | 9/2001 | Lang et al. | |
| 6,411,878 B2 | 6/2002 | Hanawa et al. | |
| 6,671,609 B2 | 12/2003 | Nantz et al. | |
| 9,078,391 B2 | 7/2015 | Pichlmaier | |
| 9,086,699 B2 | 7/2015 | Pirotais | |
| 9,228,322 B2 | 1/2016 | Keys, II et al. | |
| 9,685,009 B2 | 6/2017 | Sprock et al. | |
| 9,719,586 B2 | 8/2017 | Schulte et al. | |
| 9,751,372 B2 | 9/2017 | Traut et al. | |
| 9,855,843 B2 | 1/2018 | Vik et al. | |
| 9,873,296 B2 | 1/2018 | Wieckhorst et al. | |
| 2005/0087378 A1 | 4/2005 | Hrazdera | |
| 2007/0271017 A1 * | 11/2007 | Sarnie | F16H 61/0213 701/55 |
| 2008/0228366 A1 * | 9/2008 | Lehner | B60K 31/047 701/70 |
| 2014/0110168 A1 * | 4/2014 | Pursimo | E21B 7/025 701/50 |
| 2014/0196919 A1 | 7/2014 | Kowalchuk | |
| 2014/0278041 A1 * | 9/2014 | Brenninger | F16H 61/425 701/124 |
| 2015/0006051 A1 * | 1/2015 | McIntyre | B60C 23/0433 701/70 |
| 2015/0082779 A1 * | 3/2015 | Shirao | E02F 9/2292 60/393 |
| 2016/0031443 A1 * | 2/2016 | Komatsu | B60W 10/101 701/93 |
| 2016/0039480 A1 | 2/2016 | Pichlmaier | |
| 2016/0221582 A1 | 8/2016 | Sudou | |
| 2016/0347300 A1 | 12/2016 | Bennett | |
| 2016/0355187 A1 | 12/2016 | Nothdurft | |
| 2016/0368493 A1 | 12/2016 | Driscall et al. | |
| 2017/0043623 A1 | 2/2017 | Bowman et al. | |
| 2017/0043793 A1 | 2/2017 | Evans et al. | |
| 2017/0072959 A1 | 3/2017 | Bergin | |
| 2017/0087994 A1 | 3/2017 | Kakisako | |
| 2017/0177011 A1 | 6/2017 | Garvin et al. | |
| 2017/0217411 A1 | 8/2017 | Albright et al. | |
| 2017/0325393 A1 * | 11/2017 | Gschwendtner | E02F 3/84 |
| 2017/0325394 A1 | 11/2017 | Clement et al. | |
| 2018/0002894 A1 * | 1/2018 | Yamamoto | F02D 29/02 |
| 2018/0009421 A1 | 1/2018 | Albright et al. | |
| 2018/0087242 A1 * | 3/2018 | Mitchell | E02F 3/431 |
| 2019/0104675 A1 * | 4/2019 | Shinkai | B60W 10/06 |
| 2019/0168773 A1 * | 6/2019 | Hamdoun | B60W 30/146 |
| 2020/0018037 A1 * | 1/2020 | Nakamura | E02F 3/43 |
| 2020/0290464 A1 * | 9/2020 | Oh | B60L 15/2045 |
| 2021/0170910 A1 * | 6/2021 | Sato | H01M 8/0494 |
| 2021/0176909 A1 * | 6/2021 | Foster | A01B 79/005 |

OTHER PUBLICATIONS

"South West Dealers to Welcome Latest Models: Machinery New Transmission and Hassle-Free Emissions Feature on the Next Generation of Mccormick X7 Series Tractors," The Western Morning News, [Plymouth (UK)] Dec. 20, 2017: 20, (2 pages) https://dialog.proquest.com/professional/docview/1978928657?accountid=157282.

"Operator Manual," Great Plains Manufacturing Inc., Retrieved on Aug. 22, 2017 (94 pages) https://www.greatplainsmfg.com/manuals/pdf/500-641m.pdf.

Josiah Jones, "Kit to Look Out for at Sima 2017," Farmers Weekly, 166.17: 60-61. Reed Business Infomation UK. (Dec. 9, 2016) (2 pages) https://dialog.proquest.com/professional/docview/1873324413?accountid=157282.

Jim Park, "Too fast for your tires?," Truckinginfo.com, Apr. 8, 2015 (9 pages) http://www.truckinginfo.com/blog/on-the-road/story/2015/04/too-fast-for-your-tires.aspx.

* cited by examiner

SYSTEM AND METHOD FOR CONTROLLING THE SPEED OF A WORK VEHICLE TOWING AN IMPLEMENT

FIELD OF THE INVENTION

The present disclosure relates generally to work vehicles, and, more particularly, to a system and method for controlling the speed of a work vehicle towing an implement.

BACKGROUND OF THE INVENTION

A wide range of implements are known, are presently in use, and are particularly designed for towing behind a work vehicle. For example, agricultural implements, such as planters, typically include multiple row units distributed across a width of the implement and a configured to be towed behind a tractor. In a working position of the planter, each row unit is configured to deposit seeds at a desired depth beneath the soil surface, thereby establishing rows of planted seeds. For example, each row unit may include a ground engaging tool or opener (e.g., an opener disc) that forms a seeding path for seed deposition into the soil. As the implement travels across a field, the opener excavates a trench into the soil, and seeds are deposited into the trench. When the planter is moved into a transport position, the planter is raised such that the row units no longer engage the ground (i.e., the ground engaging tools of the planter are raised relative to the ground).

Agricultural implements have tires that are rated to carry a certain weight at speeds up to a maximum rated speed. As the weight of the implement increases (e.g., due to heavier loads), the maximum rated speed of the implement tires begins to drop. Typically, the maximum rated speed of the implement tires is much lower than the maximum speed of the work vehicle. During an agricultural operation, such as a planting operation, the agricultural implement is typically towed by the work vehicle at speeds well below the maximum rated speed and load of the implement tires to preserve the quality of the agricultural operation. As such, the towing speed during an agricultural operation usually does not come close to the maximum rated speed or load of the implement tires. However, during transport, the implement is not limited by the quality of the agricultural operation. As such, the implement may be towed at higher speeds during transport, which may include speeds above the maximum rated speed for the load on implement tires.

Currently, there is no way to prevent an operator of the work vehicle from towing the agricultural implement at speeds above the maximum rated speed for the load on the implement tires. While more robust tires could be selected that would allow the work vehicle to safely tow the loaded implement at speeds closer to the maximum speed of the work vehicle, such tires may be prohibitively expensive.

Accordingly, a system and method for controlling the speed of a work vehicle towing an implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for controlling the speed of a work vehicle. The system includes a work vehicle and an implement towed by the work vehicle. The implement is movable between a working position, in which ground engaging tools of the implement are configured to perform a field operation, and a transport position, in which the ground engaging tools are raised relative to the ground. The system further includes a sensor configured to generate data indicative of an implement weight supported by the implement while the implement is in the transport position. Additionally, the system includes a controller communicatively coupled to the sensor. The controller is configured to monitor the implement weight supported by the implement and adjust a maximum speed limit for the work vehicle based at least in part on the implement weight.

In another aspect, the present subject matter is directed to a method for controlling the speed of a work vehicle towing an implement, where the implement is movable between a working position, in which ground engaging tools of the implement are configured to perform a field operation, and a transport position, in which the ground engaging tools are raised relative to the ground. The method includes monitoring, with a computing device, an implement weight supported by the implement while the implement is in the transport position. The method further includes comparing, with the computing device, the implement weight to a predetermined threshold weight. Additionally, the method includes, when the implement weight differs from the predetermined threshold weight, adjusting, with the computing device, a maximum speed limit for the work vehicle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
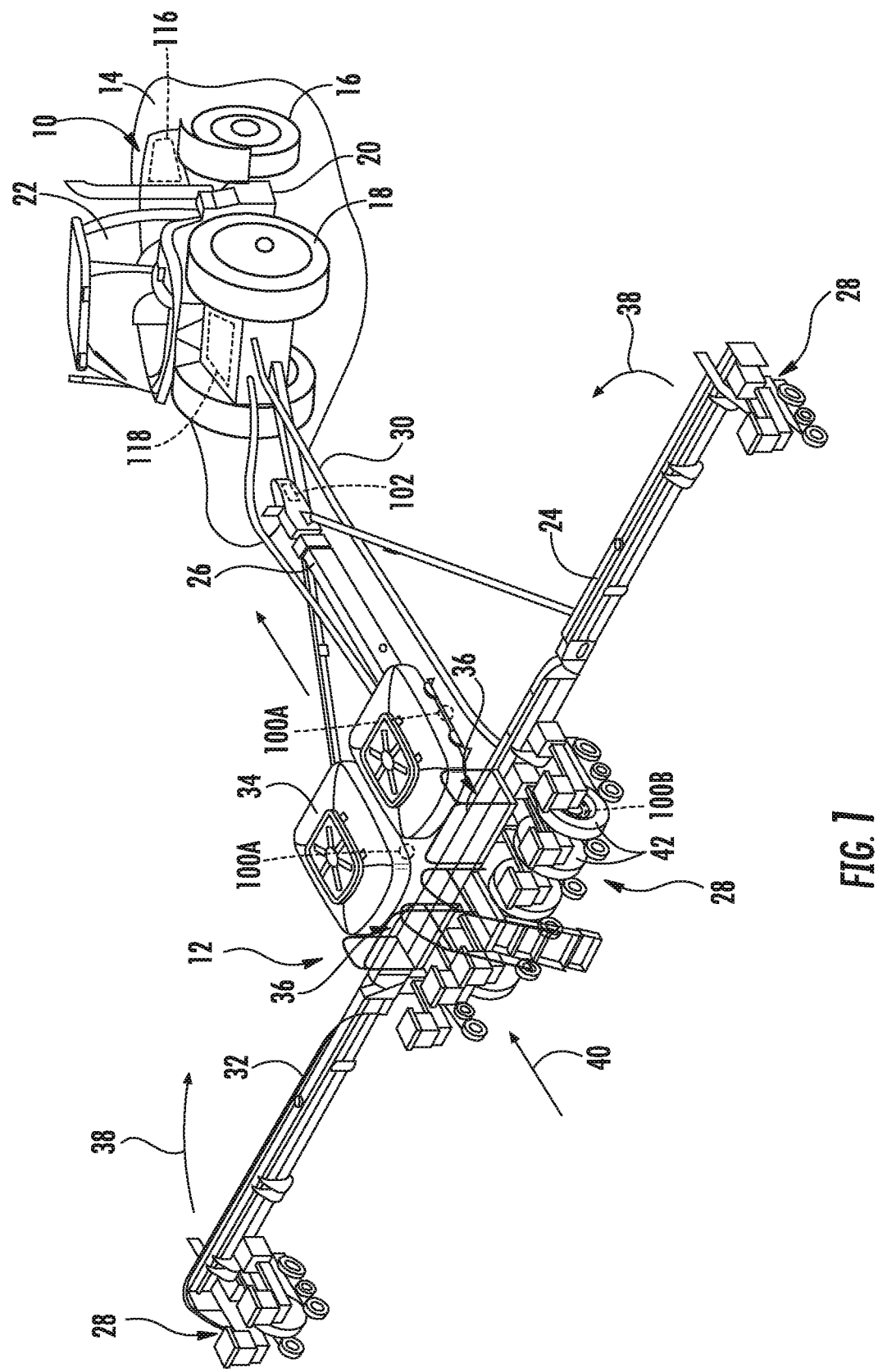
FIG. 1 illustrates a perspective view of one embodiment of a work vehicle towing a planter in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention.

In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling the speed of a work vehicle towing an implement. Specifically, in several embodiments, a controller of the disclosed system may be configured to monitor a weight of the implement or "implement weight" while the implement is in its transport position and compare the implement weight to an associated threshold weight (e.g., weight associated with current maximum speed limit of the work vehicle). If the implement weight exceeds the threshold weight, the controller may adjust (i.e., reduce) the maximum speed limit of the work vehicle (e.g., to a maximum speed permitted for the current loading of the tires) to prevent the work vehicle from towing the implement at unsafe or unstable speeds during transport. Further, in some embodiments, the controller may be configured to monitor the attachment or hitching of the implement to the work vehicle to prevent an operator from overriding the speed control. Additionally, in some embodiments, the controller may be configured to monitor the speed of the work vehicle relative to the maximum speed limit and, when the speed of the work vehicle exceeds the maximum speed limit, adjust the speed of the work vehicle to be below the maximum speed limit.

In one embodiment, the controller is configured as an implement-based controller provided in association with the implement and configured to control the operation of the implement. In such embodiment, the implement-based controller is configured to transmit requests to the vehicle (e.g., via ISObus control), when necessary, to adjust the speed limit of the work vehicle. However, in other embodiments, the controller is configured as a vehicle-based controller provided in association with the work vehicle and configured to control the operation of the work vehicle. In such embodiment, the vehicle may be configured to control its own maximum speed limit.

Referring now to drawings, FIG. 1 illustrates a perspective view of one embodiment of a work vehicle 10 towing an agricultural implement 12 across the ground 14. As shown, the work vehicle 10 is configured as an agricultural tractor and the agricultural implement 12 is configured as a planter. However, in other embodiments, the work vehicle 10 may be configured as any other suitable agricultural vehicle and the agricultural implement 12 may be configured as any other suitable agricultural implement.

As shown in FIG. 1, the work vehicle 10 includes a pair of front wheels 16 (and associated front tires), a pair of rear wheels 18 (and associated rear tires) and a frame or chassis 20 coupled to and supported by the wheels. An operator's cab 22 may be supported by a portion of the chassis 20 and may house various input devices for permitting an operator to control the operation of one or more components of the work vehicle 10 and/or one or more components of the implement 12. Additionally, as is generally understood, the work vehicle 10 may include an engine 116 and a transmission 118 mounted on the chassis 20. The transmission 118 may be operably coupled to the engine 116 and may provide variably adjusted gear ratios for transferring engine power to the wheels 16, 18 via a drive axle assembly (or via axles if multiple drive axles are employed).

Additionally, as shown in FIG. 1, the implement 12 may include a laterally extending toolbar or frame assembly 24 connected at its middle to a forwardly extending tow bar 26. The frame assembly 24 may be supported by one or more wheels 42. The frame assembly 24 may generally be configured to support a plurality of seed planting units (or row units) 28. As is generally understood, each row unit 28 may be configured to deposit seeds at a desired depth beneath the soil surface and at a desired seed spacing as the implement 12 is being towed by the work vehicle 10, thereby establishing rows of planted seeds.

It should be appreciated that, for purposes of illustration, only a portion of the row units 28 of the implement 12 have been shown in FIG. 1. In general, the implement 12 may include any number of row units 28, such as 6, 8, 12, 16, 24, 32, or more row units. In addition, it should be appreciated that the lateral spacing between row units 28 may be selected based on the type of crop being planted and on the implement configuration. For example, the row units 28 may be spaced approximately 30 inches from one another for planting corn, and approximately 15 inches from one another for planting soybeans when the implement 12 is configured similar to the planter shown. Alternatively, if the implement 12 is configured as an air cart and an air seeder (not shown), the lateral spacing between rows of the air seeder may be a small as 6 inches, 9 inches, 10 inches, or 12 inches for seeding wheat, oats, barley, peas, canola, and/or the like.

In several embodiments, the work vehicle 10 may be configured to supply a working fluid (e.g., hydraulic fluid, air, water) to the implement 12 via one or more fluid lines 30. In such embodiments, one or more motors (e.g., hydraulic motors) of the implement 12 may receive the working fluid from the work vehicle 10 for driving one or more related systems of the implement 12. For example, one or more hydraulic motors may drive a fan and/or a seed drive to direct agricultural material (e.g., seeds, fertilizer, and/or the like) along various supply lines 32 extending between the row units 28 and one or more associated tanks 34 of the implement 12.

Moreover, in several embodiments, the frame assembly 24 of the implement 12 may be adjustable. For instance, the frame assembly 24 may be configured to be folded upwardly from the working position or configuration shown in FIG. 1, in which the ground engaging tools (e.g., row units 28) are configured to engage the ground to perform a field operation, to a transport position or configuration (e.g., via rotation of wings about joints 36) as indicated by arrows 38 in FIG. 1, in which the ground engaging tools are raised relative to the ground. Similarly, the frame assembly 24 may also be configured to be pivoted so as to align the frame assembly 24 with a direction of travel 40 of the work vehicle 10. Further, the frame assembly 24 may be configured to be raised from the working position to the transport position, such that the distance between the frame assembly 24 and the ground increases between the working position and the transport position.

Furthermore, in accordance with aspects of the present subject matter, the implement 12 may include one or more sensors 100 configured to generate data indicative of a weight of the implement 12 being towed by the work vehicle 10. For instance, the sensors 100 may comprise one or more reservoir sensors 100A and/or one or more wheel bearing sensors 100B. Each reservoir sensor 100A may be positioned between a respective one of the reservoirs 34 and a frame member of the implement 12 (e.g., the towbar 26)

such that reservoir sensor 100A is configured to detect the weight of the reservoir 34. If the weight of the implement 12 is already provided, the total implement weight supported by the implement 12 is equal to the sum of the weight of the implement 12 and the detected weight(s) of the reservoir(s) 34. Otherwise, each wheel bearing sensor 100B may be associated with one of the ground engaging wheels 42 configured to support the frame assembly 24 of the implement 12 to detect the overall weight of the implement 12 (e.g., with the weight of the reservoir(s) 34 included). The sensor(s) 100A, 100B may correspond to one or more load sensors (e.g., a load cell(s)), however, the sensor(s) 100A, 100B may correspond to any other suitable sensors. It should be appreciated that the sensors 100 may be positioned at any other suitable location such that data indicative of the weight of the implement 12 may be generated. For instance, in an embodiment where the implement 12 is configured as a combination of towed implements, such as an air cart and an air seeder (not shown), where the air cart is configured to supply seeds to the air seeder for seeding within the field, the reservoir sensor(s) 100A may be associated with the reservoir(s) of the air cart and the air seeder and/or the wheel bearing sensors 100B may be associated with both the air cart and the air seeder such that the total load on the tires of each of the air cart and the air seeder may be determined, or such that the overall weight of the towed implement 12 (e.g., the air cart and air seeder together) may be determined. The weight of the implement 12, or the weight of individual implements of a combination of implements towed by the work vehicle 10 (e.g., the weight of the air cart and the weight of the air seeder), may be used to set the maximum speed limit of the work vehicle 10 as will be described in greater detail below.

Additionally, one or more hitch sensors 102 may be positioned at the interface between the work vehicle 10 and the implement 12 and configured to detect when the implement 12 is coupled or hitched to the work vehicle 10. The hitch sensor(s) 102 may correspond to one or more load sensors, similar to the sensors 100. However, the hitch sensor(s) 102 may correspond to any other suitable sensors, such as proximity sensor(s) (e.g., capacitive sensor(s), magnetic sensor(s), and/or the like). As will be described in greater detail below, the implement weight may be configured to be monitored only when the implement 12 is attached to the work vehicle 10 such that the work vehicle 10 is towable by the implement 12. The use of such hitch sensor(s) 102 may help prevent manual override of the system described herein.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 10, or rely on tracks in lieu of the tires 16, 18. For instance, the work vehicle 10 may correspond to a "fully tracked" work vehicle having tracks in lieu of both of its front and rear wheels or a "half-tracked" work vehicle having tracks in lieu of its front wheels or its rear wheels.

Similarly, it should also be appreciated that the configuration of the agricultural implement 12 described above and shown in FIG. 1 is only provided for exemplary purposes. Tus, it should be appreciated that the present subject matter may be readily adaptable to any manner of implement configuration or use. For instance, the agricultural implement 12 may instead be configured as a tillage implement, sprayer, seeder, and/or the like. Similarly, the agricultural implement 12 may instead include a combination of towed implements towed by the work vehicle 10, where the weight of each implement of the combination of implements are compared to control the maximum speed limit of the work vehicle 10. For example, as discussed above, the agricultural implement 12 may be configured as an air cart and an air seeder (not shown). In such embodiment, the speed of the work vehicle 10 towing both the air cart and the air seeder may be limited based at least in part on the lower of a maximum rated speed for the tires of air cart for the load supported by the air cart or a maximum rated speed for the air seeder tires for the weight of the air seeder.

Figure 2:
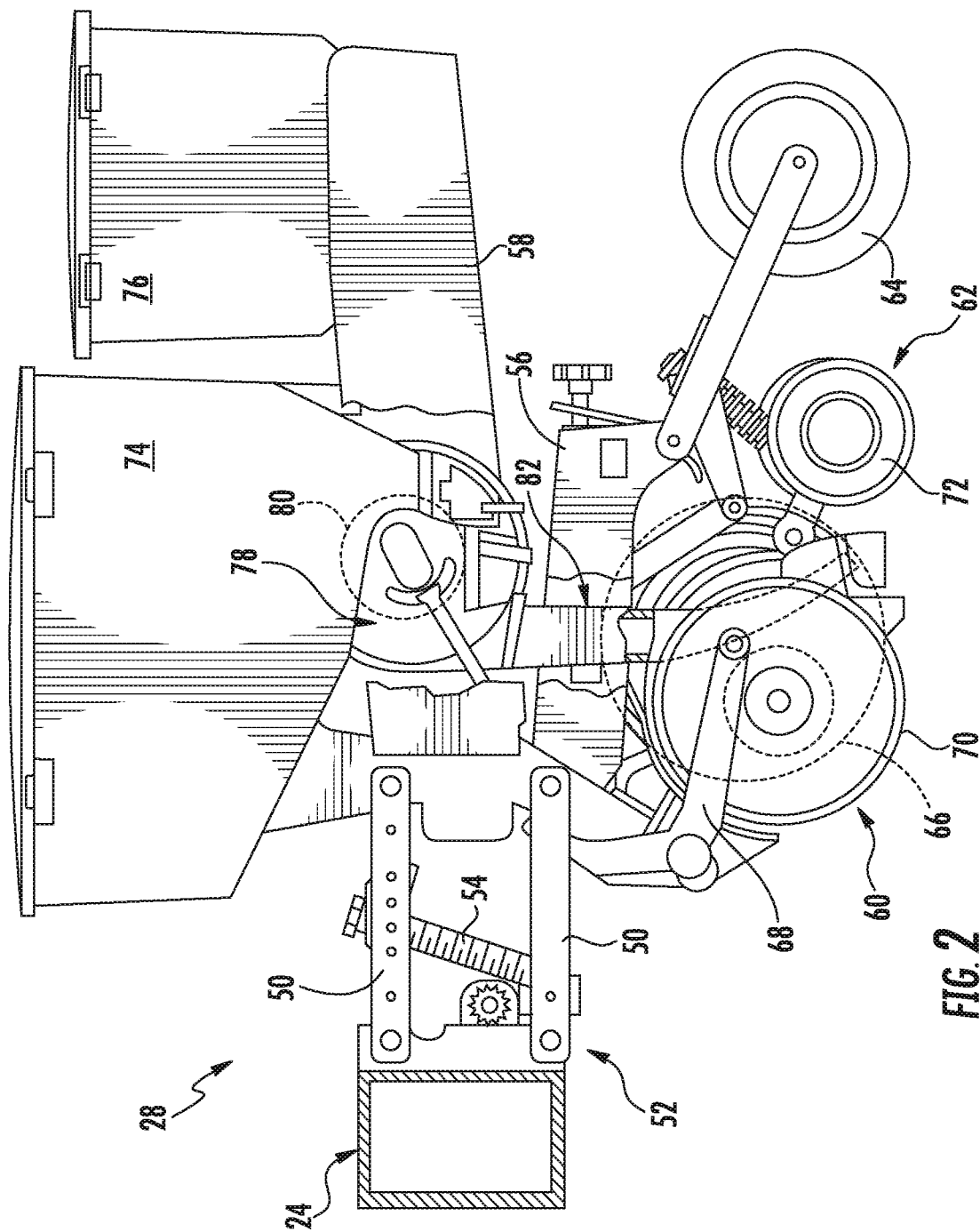
FIG. 2 illustrates a side view of one embodiment of a row unit suitable for use within a planter in accordance with aspects of the present subject matter.

Referring now to FIG. 2, a side view of one embodiment of a row unit 28 is illustrated in accordance with aspects of the present subject matter. As shown, the row unit 28 includes multiple arms 50 of a linkage assembly 52 configured to mount the row unit 28 to the toolbar or frame assembly 24 of the implement 12. As is generally understood, the linkage assembly 52 may be configured to allow vertical movement of each row unit 28 to account for uneven terrain while maintaining a desired down force such that the row unit 28 remains in contact with the ground. Additionally, a biasing member 54 may extend between a mounting bracket (not shown) and a lower arm 50 of the linkage assembly 52 to establish the down force on the row unit 28. In the illustrated embodiment, the biasing member 54 corresponds to a spring configured to exert a constant downward force. In such an embodiment, an adjustment bracket (not shown) may be used to at least partially compress the spring to vary the amount of down force applied by the spring. Alternatively, the biasing member 54 may correspond to a fluid-driven actuator, such as a pneumatic or hydraulic cylinder. In such an embodiment, the operation of the actuator may be dynamically controlled to vary the down force applied through the row unit 28. Additionally, in several embodiments, a chassis 56 and a frame 58 may be pivotally mounted to the linkage assembly 50, with the chassis 56 and the frame 58 being configured to support the various other components of the row unit 28.

As shown in FIG. 2, the row unit 28 also includes a plurality of ground engaging tools or assemblies, such as a furrow opening assembly 60, a furrow closing assembly 62, and a press wheel 64. In general, the furrow opening assembly 60 may include a gauge wheel 66 operatively connected to the chassis 56 via an arm 68. Additionally, the opening assembly 60 may also include one or more opening disks 70 configured to excavate a furrow, or trench, in the soil. As is generally understood, the gauge wheel 66 may be configured to engage the surface of the field, with the height of the opening disk(s) 70 being adjusted with respect to the position of the gauge wheel 66 to set the desired depth of the furrow being excavated. Moreover, as shown, the furrow closing assembly 62 may include a closing disk(s) 72 configured to close the furrow after seeds have been deposited into the furrow. The press wheel 64 may then be configured to roll over the closed furrow to firm the soil over the seed and promote favorable seed-to-soil contact.

Additionally, as shown in FIG. 2, the row unit 28 may include a seed hopper 74 and, optionally, a pesticide hopper 76 supported on the frame 58. In general, the seed hopper 74 may be configured to store the seeds to be gravitationally deposited within the furrow as the row unit 28 moves over and across the field. Additionally, as shown in FIG. 2, the row unit 28 may include a seed meter 78 provided in operative association with the seed hopper 74. As is generally understood, the seed meter 78 may be configured to uniformly release seeds received from the seed hopper 74 for deposit within the furrow. For instance, in one embodiment, the seed meter 78 may be coupled to a suitable vacuum source 80 (e.g., a blower powered by a motor and associated tubing or hoses) configured to generate a vacuum or negative pressure that attaches the seeds to a rotating seed disc (not shown) of the seed meter 78, which controls the rate at which the seeds are output from the seed meter 78 to an associated seed tube 82. As shown in FIG. 2, the seed tube 82 may extend vertically between the seed meter 78 and the ground to facilitate delivery of the seeds output from the seed meter 78 to the furrow.

It should be appreciated that, as an alternative to a vacuum seed meter, the seed meter 78 may correspond to any other suitable type of seed meter, such as a pressure or mechanical seed meter. Additionally, in one embodiment, the seed meter 78 may form part of or may be configured as an electric drive vacuum seed meter. Moreover, as an alternative to the gravity drop seed tube 82, the row unit 28 may include an electric drive seed delivery system for delivering seeds to the furrow.

It should be appreciated that the configuration of the row unit 28 described above and shown in FIG. 2 is provided only to place the present subject matter in an exemplary field of use. Thus, it should be appreciated that the present subject matter may be readily adaptable to any manner of seed planting unit configuration.

Figure 3:
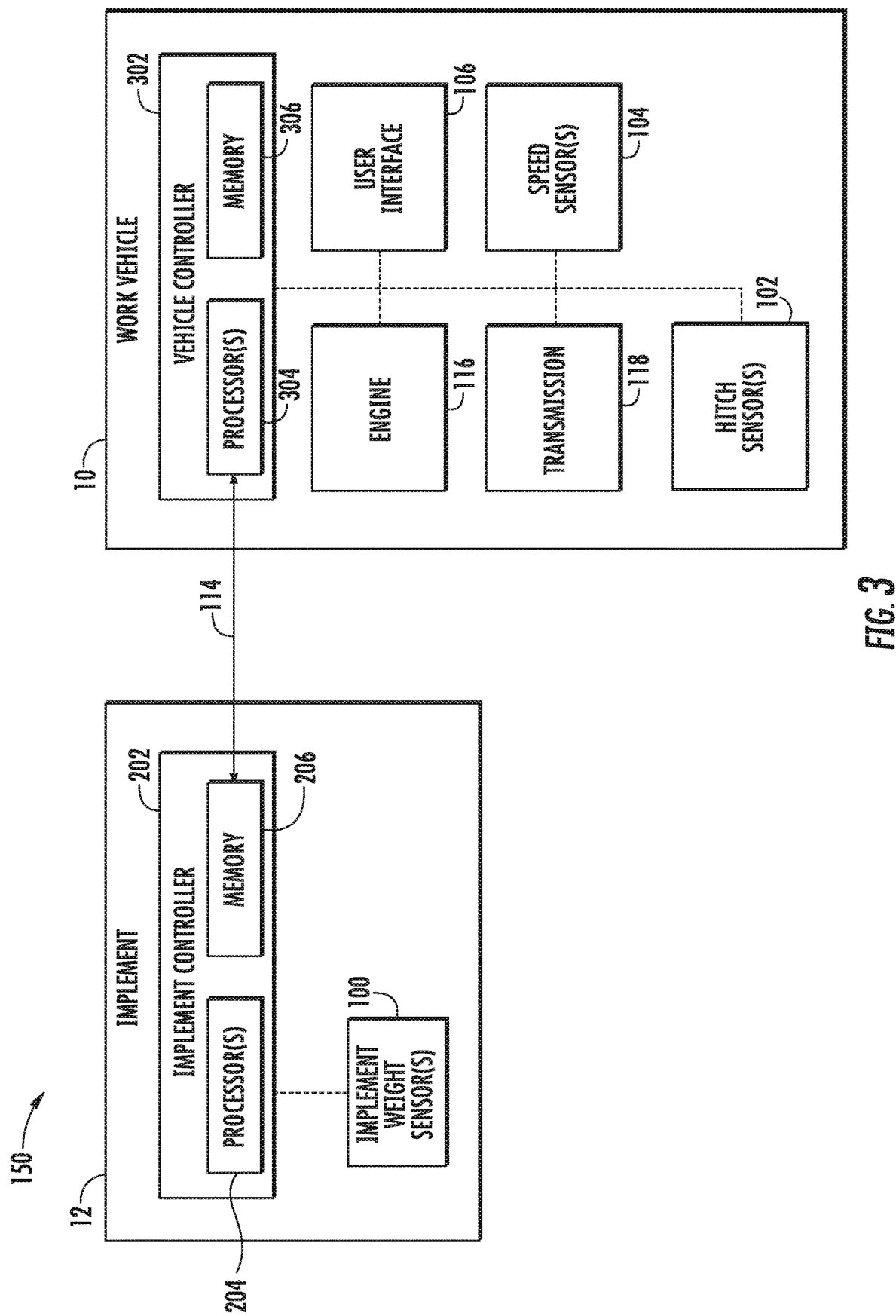
FIG. 3 illustrates a schematic view of one embodiment of a system for controlling the speed of a work vehicle towing an implement in accordance with aspects of the present subject matter.

Referring now to FIG. 3, a schematic view of one embodiment of a system 150 for controlling the speed of a work vehicle towing an implement is illustrated in accordance with aspects of the present subject matter. In general, the system 150 will be described herein with reference to the work vehicle 10, the implement 12, and the row unit 28 shown in FIGS. 1 and 2. However, it should be appreciated that the disclosed system 150 may be implemented with work vehicles and/or implements having any other suitable configurations and/or with row units having any other suitable configuration As shown, the system 150 may generally include an implement-based controller 202 (hereafter referred to as "implement controller 202") installed on and/or otherwise provided in operative association with the implement 12 and a vehicle-based controller 302 (hereafter referred to as "vehicle controller 302") installed on and/or otherwise provided in operative association with the work vehicle 10. In general, each controller 202, 302 of the disclosed system 150 may correspond to any suitable processor-based device (s), such as a computing device or any combination of computing devices. Thus, in several embodiments, the implement controller 202 may include one or more processor(s) 204 and associated memory devices 206 configured to perform a variety of computer-implemented functions. Similarly, in several embodiments, the vehicle controller 302 may include one or more processor(s) 304 and associated memory device(s) 306 configured to perform a variety of computer-implemented functions.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 206, 306 of each controller 202, 302 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 206, 306 may generally be configured to store suitable computer-readable instructions that, when implemented by the processor(s) 204, 304 configure each controller 202, 302 to perform various computer-implemented functions, such as one or more aspects of the method 400 described below with reference to FIG. 4.

In addition, each controller 202, 302 may also include various other suitable components, such as a communications circuit or module, a network interface, one or more input/output channels, a data/control bus and/or the like, to allow each controller 202, 302 to be communicatively coupled to the other controller and/or to any of the various other system components described herein (e.g., the various sensors 100, 102, etc.). For instance, as shown in FIG. 3, a communicative link or interface (e.g., a data bus) may be provided between the implement controller 202 and the vehicle controller 302 to allow the controllers 202, 302 to communicate with each other via any suitable communications protocol. For the purposes of illustration, the communicative link is shown with an arrow. Specifically, in one embodiment, an ISOBus Class 3 (ISO11783) interface may be utilized to provide a standard communications protocol between the controllers 202, 302. Alternatively, a proprietary communications protocol may be utilized for communications between the implement controller 202 and the vehicle controller 302.

In general, the implement controller 202 may generally be configured to control the operation of one or more components of the implement 12. For instance, in several embodiments, the implement controller 202 may be configured to control the operation of one or more components that regulate the down force applied through each row unit 28 and/or one or more components that adjust the operation of the seed meter 78. Further, the implement controller 202 may be configured to control the operation of one or more components or systems of the implement 12 to move the implement 12 between the working and transport positions. For instance, the implement controller 202 may be configured to control the actuation of one or more actuators (not shown) to contract or extend to rotate the wings about joints 36 as indicated by arrows 38 in FIG. 1, to pivot the frame assembly 24 to adjust the alignment of the frame assembly 24 with the direction of travel 40 of the work vehicle 10, and/or to raise or lower the frame assembly 24.

Additionally, the implement controller 202 may also be communicatively coupled to the implement weight sensor(s) 100 to allow the sensor data generated thereby to be transmitted to the implement controller 202 for subsequent processing and/or for subsequent transmittal to the vehicle controller 302. For instance, in one embodiment, the implement controller 202 may be configured to process/analyze the sensor data from the sensor(s) 100 to determine the implement weight. The monitored implement weight may then be stored within the memory 206 of the implement controller 202 and/or transmitted to the vehicle controller 302. Alternatively, the sensor data from the sensor(s) 100 may be transmitted from the implement controller 202 to the vehicle controller 302 to allow the vehicle controller 302 to process/analyze the sensor data to determine the implement weight. In such an embodiment, the monitored implement weight may then be stored within the memory 306 of the vehicle controller 302 and/or transmitted to the implement controller 202.

Similarly, the vehicle controller 302 may be configured to control the operation of one or more components of the work vehicle 10. For instance, as shown in FIG. 3, in several embodiments, the vehicle controller 302 may be configured to control the operation of an engine 116 and/or a transmission 118 of the work vehicle 10 to adjust the vehicle's ground speed. Specifically, as is generally understood, the vehicle controller 302 may be configured electronically control the operation of the engine 116 by transmitting suitable control signals for controlling an engine or speed governor (not shown) associated with the engine 116. Similarly, the vehicle controller 302 may be configured to control the operation of the transmission 118 by transmitting suitable control signals for controlling the engagement/disengagement of one or more clutches (not shown) provided in operative association with the transmission 118.

Further, as shown in the illustrated embodiment, the vehicle controller 302 may be communicatively coupled to a user interface 106 associated with the work vehicle 10. In general, the user interface 106 may be correspond to any suitable input device(s) configured to allow the operator to provide operator inputs to the vehicle controller 302, such as a touch screen display, a keyboard, joystick, buttons, knobs, switches, and/or combinations thereof. As will be described in greater detail below, to execute the speed control disclosed herein, the operator may be asked to provide various inputs into the system 150 via the user interface 106. In some embodiments, the inputs provided by the operator may be transmitted from the vehicle controller 302 to the implement controller 202 via the communications interface 114 to allow the implement controller 202 to execute the disclosed speed control. In one embodiment, suitable operator inputs may include, but are not limited to, maximum and minimum ground speed values, a desired speed change increment value (e.g., an increment for reducing the maximum speed limit), tire rating (e.g., maximum load, maximum speed, etc.), unloaded implement weight, and/or the like. Additionally, the vehicle controller 302 may be configured to control the user interface 106 to display or indicate one or more operating conditions of the work vehicle 10 and/or implement 12 to an operator. For instance, the vehicle controller 302 may indicate to an operator the current maximum speed limit of the work vehicle 10. It should be appreciated that the user interface 106 may include any suitable indicators in addition to the screen display, such as lights, audio devices (e.g., alarms, speakers, etc.), and/or the like to provide indicators to an operator.

Moreover, the vehicle controller 302 may be communicatively coupled to one or more sensors configured to detect one or more operating parameters of the work vehicle 10. For instance, as shown in FIG. 3, the vehicle controller 302 may be communicatively coupled to one or more speed sensors 104 configured to generate data indicative of a speed-related parameter of the work vehicle 10. The sensor data generated by the speed sensor(s) 104 may be transmitted to the vehicle controller 302 for subsequent processing and/or for subsequent transmittal to the implement controller 202. For instance, in one embodiment, the vehicle controller 302 may be configured to process/analyze the sensor data from the speed sensor(s) 104 to determine the ground speed of the work vehicle 10. The monitored ground speed of the work vehicle 10 may then be stored within the memory 306 of the vehicle controller 302 and/or transmitted to the implement controller 202. Alternatively, the sensor data from the speed sensor(s) 104 may be transmitted from the vehicle controller 302 to the implement controller 202 (e.g., via the communications interface 114) to allow the implement controller 202 to process/analyze the sensor data to determine the ground speed of the work vehicle. In such embodiment, the monitored work vehicle speed may then be stored within the memory 208 of the implement controller 202 and/or transmitted to the vehicle controller 302.

Additionally, the vehicle controller 302 may be communicatively coupled to one or more hitch sensors, such as the hitch sensor(s) 102 described above, configured to detect whether the implement 12 is coupled to the work vehicle 10. The sensor data generated by the hitch sensor(s) 102 may be transmitted to the vehicle controller 302 for subsequent processing and/or for subsequent transmittal to the implement controller 202, similar to the data generated by the speed sensor(s) 104 described above. For instance, in one embodiment, the vehicle controller 302 may be configured to process/analyze the sensor data from the hitch sensor(s) 102 to determine whether the implement 12 is coupled to the work vehicle 10. The monitored attachment of the implement 12 may then be stored within the memory 306 of the vehicle controller 302 and/or transmitted to the implement controller 202. Alternatively, the sensor data from the hitch sensor(s) 102 may be transmitted from the vehicle controller 302 to the implement controller 202 (e.g., via the communications interface 114) to allow the implement controller 202 to process/analyze the sensor data to determine whether the implement 12 is coupled to the work vehicle 10. In such embodiment, the monitored attachment of the implement 12 may then be stored within the memory 208 of the implement controller 202 and/or transmitted to the vehicle controller 302.

As indicated above, in some embodiments, the implement controller 202 may be configured to provide implement-based control of the maximum ground speed of the work vehicle 10. Specifically, in several embodiments, the implement controller 202 may be configured to compare the monitored implement weight to a predetermined threshold weight of the implement 12, starting from when the implement 12 is moved into or is in its transport position. The threshold weight may be received from the vehicle controller 302 (e.g., operator inputs provided via the user interface 122 and/or default values pre-stored within the vehicle controller 302) and/or from the memory 206 of the implement controller 202. The threshold weight generally corresponds to the weight of the implement 12, or of a load supported by the implement 12, that may safely be towed by the work vehicle 10 at the maximum speed limit. In the event that the monitored implement weight is greater than the threshold weight (i.e., meaning that the implement 12 is heavily loaded), the implement controller 202 may be configured to limit the maximum speed limit of the work vehicle 10 to minimize equipment and/or tire instability. In particular, the implement controller 202 may be configured to transmit a speed limit change request to the vehicle controller 302 to reduce the maximum speed limit of the work vehicle 10.

Moreover, in some embodiments, the implement controller 202 may be configured to monitor a speed of the work vehicle 10. For instance, the data received from the speed sensor(s) 104 and/or the speed of the work vehicle determined by the vehicle controller 302 based at least in part on the data received from the speed sensor(s) 104 may be transmitted from the vehicle controller 302 to the implement controller 202. The implement controller 202 may be configured to compare the monitored vehicle speed to the new maximum speed limit. If the monitored vehicle speed exceeds the new maximum speed limit, the implement controller 202 may be configured to transmit a speed change request to the vehicle controller to control the operation of work vehicle 10 in a manner that decreases the ground speed of the work vehicle 10 to keep the speed of the work vehicle 10 at or below the new maximum speed limit.

Additionally, the implement controller 202 may be configured to return the maximum speed limit to its previous value when the implement 12 is moved into the working position. For instance, when the implement 12 is no longer in its transport position, more of the implement weight may be supported, e.g., by the row units, which reduces the load on the main tires 42 of the implement 12. As such, the implement 12 may be towed at higher speeds with less risk of equipment and/or tire instability when the implement 12 is in the working position. Thus, the implement controller 202 may be configured to transmit another speed limit change request to the vehicle controller 302 to increase the maximum speed limit of the work vehicle 10 (e.g., back to the maximum speed limit before being reduced) upon the implement 12 being moved back into its working position.

In other embodiments, the vehicle controller 302 may be configured to provide vehicle-based control of the maximum ground speed of the work vehicle 10. Specifically, in some embodiments, the implement controller 202 may be configured to transmit the data indicative of the implement weight e.g., sensor data from the sensor(s) 100, to the vehicle controller 302 when the implement 12 is in its transport position. The vehicle controller 302 may then be configured to compare the implement weight to the predetermined threshold weight. Similar to as described above, the threshold weight may be received from the vehicle controller 302 (e.g., operator inputs provided via the user interface 122 and/or default values pre-stored within the vehicle controller 302) and/or from the memory 206 of the implement controller 202. In the event that the monitored implement weight is greater than the threshold weight (i.e., meaning that the implement 12 is heavily loaded), the vehicle controller 302 may be configured to reduce the maximum speed limit of the work vehicle 10.

Moreover, in some embodiments, depending on the current ground speed of the work vehicle 10 (e.g., determined from the data received from the speed sensor(s) 104), the vehicle controller 302 may be configured to control the operation of the engine 116 and/or transmission 118 in a manner that decreases the ground speed of the work vehicle 10 to keep the speed of the work vehicle 10 at or below the new maximum speed limit.

Additionally, the vehicle controller 302 may be configured to return the maximum ground speed to its previous value when the implement 12 is moved into the working position. For instance, the vehicle controller 302 may be configured to receive inputs from the implement controller 202 indicative of the operational position of the implement 12. When it is determined that the implement 12 is no longer in its transport position (e.g., based on the operational inputs received from the implement controller 202), more of the implement weight may be supported, e.g., by the row units, which reduces the load on the main tires 42 of the implement 12. As such, the implement 12 may be towed at higher speeds with less risk of equipment and/or tire instability when the implement 12 is in the working position. Thus, the vehicle controller 302 may be configured to increase the maximum speed limit of the work vehicle 10 (e.g., back to the maximum speed limit before being reduced) upon the implement 12 being moved back into its working position.

It should be appreciated that, although the various control functions and/or actions were generally described above as being executed by one of the system controllers 202, 302, such control functions/actions may generally be executed by either of such controllers 202, 302 and/or may be distributed across both of the controllers 202, 302. For instance, in another embodiment, the sensor data from the sensor(s) 100 may be passed through the implement controller 202 to the vehicle controller 302. Similarly, the sensor data from the sensor(s) 102, 104 may be passed through the vehicle controller 302 to the implement controller 202.

Figure 4:
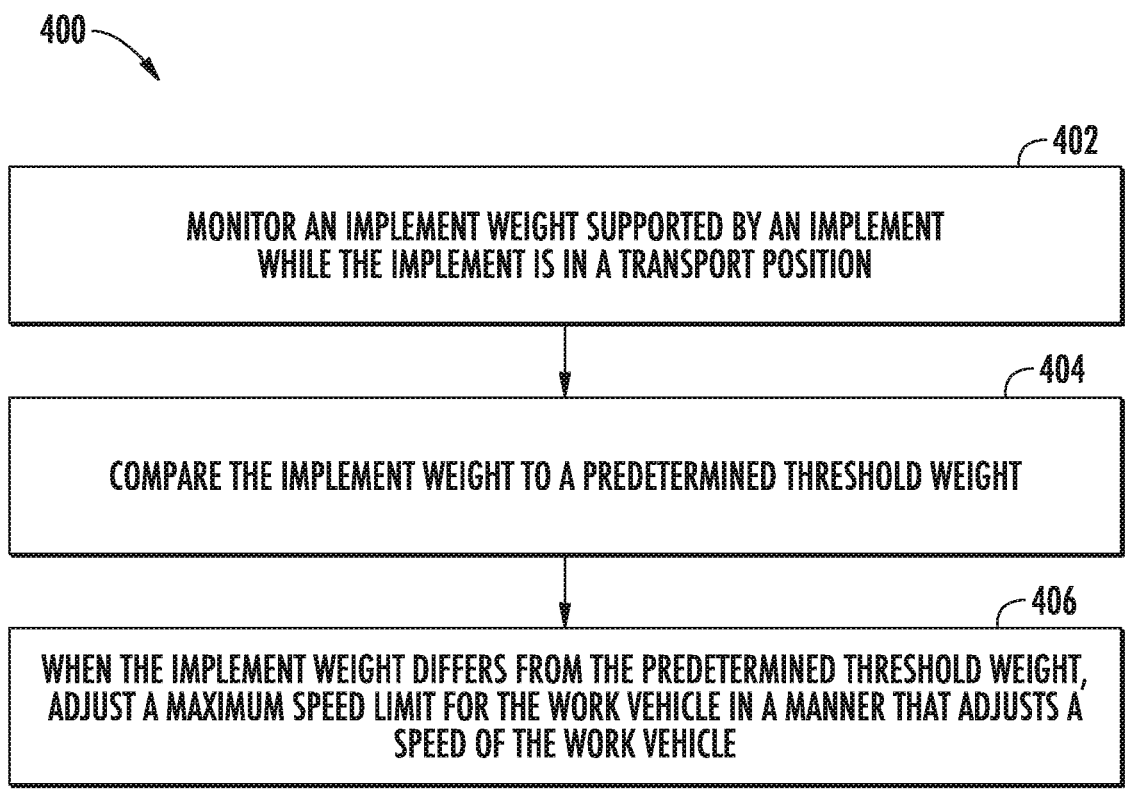
FIG. 4 illustrates a flow diagram of one embodiment of a method for controlling the speed of a work vehicle towing an implement in accordance with aspects of the present subject matter.

Referring now to FIG. 4, a flow diagram of one embodiment of a method 400 for controlling the speed of a work vehicle towing an implement is illustrated in accordance with aspects of the present subject matter. In general, the method 400 will be described herein with reference to the work vehicle 10, the implement 12, and the row unit 28 shown in FIGS. 1 and 2, as well as the various system components shown in FIG. 3. However, it should be appreciated that the disclosed method 400 may be implemented with work vehicles, implements, and/or row units having any other suitable configurations and/or within systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As indicated above, various aspects of the disclosed method 400 may be configured to be executed by the implement controller 202 or the vehicle controller 302 to limit the maximum speed of a work vehicle towing an agricultural implement. As such, the maximum speed limit of the work vehicle may be automatically controlled in a manner that provides for optimized speeds while maintaining the desired operating safety and stability for the implement 12.

As shown in FIG. 4, at (402), the method 400 may include monitoring an implement weight supported by an implement while the implement is in a transport position. For instance, as indicated above, the sensor(s) 100 may be configured to generate data indicative of a weight of the implement 12. In one embodiment the sensor(s) are communicatively coupled to the implement controller 202. The sensor data received from the sensor(s) 100 may either be processed/stored by the implement controller 202 or may be transmitted to the vehicle controller 302 for processing/storing.

Moreover, at (404), the method 400 may include comparing the implement weight to a predetermined threshold weight. For example, as described above, the controller 202, 302 may be configured to compare the monitored implement weight to a predetermined threshold weight associated with a maximum weight of the implement 12 that can be safely towed at the maximum speed limit.

Additionally, at (406), the method 400 may include, when the implement weight differs from the predetermined threshold weight, adjusting a maximum speed limit for the work vehicle. For instance, as described above, if the implement controller 202 determines that the monitored implement weight exceeds the predetermined threshold weight, the implement controller 202 may transmit a speed limit change request to the vehicle controller 302 associated with reducing the maximum speed limit of the work vehicle 10. Alternatively, if the vehicle controller 302 determines that the monitored implement weight exceeds the predetermined threshold weight, the vehicle controller 302 may reduce the maximum speed limit of the work vehicle 10.

It is to be understood that the steps of the method 400 are performed by the controller 202, 302 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the controller 202, 302 described herein, such as the method 400, is implemented in software code or instructions which are tangibly stored on a tangible computer readable medium. The controller 202, 302 loads the software code or instructions via a direct interface with the computer readable medium or via a wired and/or wireless network. Upon loading and executing such software code or instructions by the controller 202, 302, the controller 202, 302 may perform any of the functionality of the controller 202, 302 described herein, including any steps of the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for controlling the speed of a work vehicle, the system comprising:
    a work vehicle;
    an implement towed by the work vehicle, the implement being movable between a working position, in which ground engaging tools of the implement are configured to perform a field operation, and a transport position, in which the ground engaging tools are raised relative to the ground;
    a sensor configured to generate data indicative of an implement weight supported by the implement while the implement is in the transport position; and
    a controller communicatively coupled to the sensor, the controller being configured to:
        monitor the implement weight supported by the implement relative to a predetermined threshold weight;
        adjust a maximum speed limit for towing the implement with the work vehicle from a first speed limit to a second speed limit based at least in part on the implement weight and the predetermined threshold weight;
        monitor a ground speed of the work vehicle; and
        when the ground speed of the work vehicle exceeds the maximum speed limit, decrease the ground speed of the work vehicle.

2. The system of claim 1, wherein the controller is configured to adjust the maximum speed limit by reducing the maximum speed limit for the work vehicle from the first speed limit to the second speed limit when the implement weight exceeds the predetermined threshold weight,
    wherein the second speed limit is a maximum speed for tires on the implement, the maximum speed being selected based at least in part on the implement weight.

3. The system of claim 2, wherein the maximum speed limit is reduced to the second speed limit while the implement is in the transport position, and the maximum speed limit is increased back to the first speed limit when the implement is moved into the working position.

4. The system of claim 2, wherein the first speed limit is a maximum rated speed for the tires on the implement, and
    wherein the predetermined threshold weight is a maximum rated weight for the tires on the implement.

5. The system of claim 1, wherein the controller comprises an implement-based controller provided in operative association with the implement and configured to control the operation of the implement, the implement-based controller being in communication with a vehicle-based controller, the vehicle-based controller being provided in operative association with the work vehicle and configured to control the operation of the work vehicle.

6. The system of claim 5, wherein the implement-based controller is configured to adjust the maximum speed limit by transmitting a speed limit change request to the vehicle-based controller.

7. The system of claim 5, wherein the implement-based controller is configured to transmit a speed change request to the vehicle-based controller to decrease the ground speed of the work vehicle.

8. The system of claim 1, wherein the controller comprises a vehicle-based controller provided in operative association with the work vehicle and configured to control the operation of the work vehicle.

9. The system of claim 8, wherein the vehicle-based controller is configured to control the operation of the work vehicle to decrease the ground speed of the work vehicle.

10. The system of claim 1, further comprising a hitch sensor configured to indicate when the implement is coupled to the work vehicle, the controller being configured to monitor the implement weight supported by the implement while the implement is coupled to the work vehicle.

11. The system of claim 1, wherein the sensor comprises a load cell provided in operative association with the implement.

12. A method for controlling the speed of a work vehicle towing an implement, the implement being movable between a working position, in which ground engaging tools of the implement are configured to perform a field operation, and a transport position, in which the ground engaging tools are raised relative to the ground, the method comprising:
    monitoring, with a computing device, an implement weight supported by the implement relative to a predetermined threshold weight while the implement is in the transport position;
    comparing, with the computing device, the implement weight to a predetermined threshold weight;

adjusting, with the computing device, a maximum speed limit for towing the implement with the work vehicle from a first speed limit to a second speed limit based at least in part on the comparison of the implement weight to the predetermined threshold weight;

monitoring, with the computing device, a ground speed of the work vehicle; and when the ground speed of the work vehicle exceeds the maximum speed limit, reducing, with the computing device, the ground speed of the work vehicle.

13. The method of claim 12, wherein adjusting the maximum speed limit of the work vehicle comprises reducing the maximum speed limit of the work vehicle from the first speed limit to the second speed limit when the implement weight exceeds the predetermined threshold weight.

14. The method of claim 13, wherein adjusting the maximum speed limit further comprises returning the maximum speed limit to the first speed limit when the implement is moved into the working position.

15. The method of claim 12, wherein the computing device comprises an implement-based computing device provided in operative association with the implement and configured to control the operation of the implement, the implement-based computing device being in communication with a vehicle-based computing device, the vehicle-based computing device being provided in operative association with the work vehicle and configured to control the operation of the work vehicle.

16. The method of claim 15, wherein adjusting the maximum speed limit for the work vehicle comprises transmitting, with the implement-based computing device, a speed limit change request to the vehicle-based computing device.

17. The method of claim 15, wherein reducing the ground speed of the work vehicle comprises transmitting, with the implement-based computing device, a speed change request to the vehicle-based computing device to reduce the ground speed of the work vehicle.

18. The method of claim 12, wherein the computing device comprises a vehicle-based computing device provided in operative association with the work vehicle and configured to control the operation of the work vehicle.

19. The method of claim 12, further comprising receiving, with the computing device, an input indicative of the implement being coupled to the work vehicle, wherein monitoring the implement weight supported by the implement comprises monitoring the implement weight supported by the implement while the implement is coupled to the work vehicle.

20. The method of claim 12, further comprising controlling, with the computing device, a user interface to indicate to an operator a current maximum speed limit of the work vehicle.

* * * * *